May 5, 1936. J. P. TARBOX 2,039,498
RAILWAY VEHICLE TIRE
Filed June 25, 1932
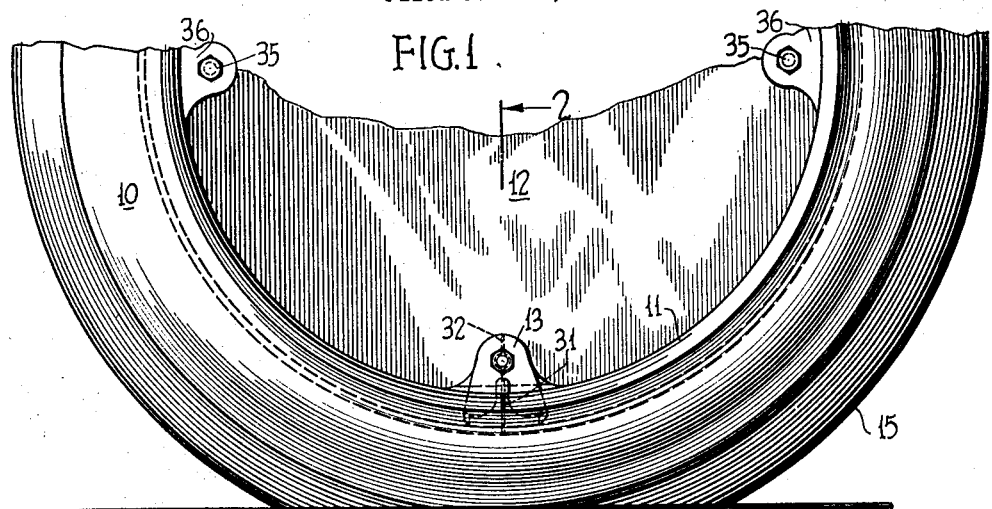
FIG.1
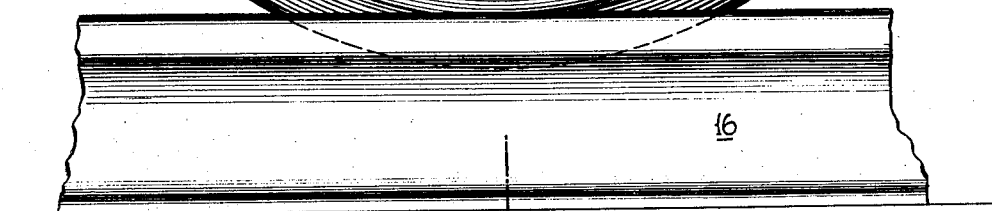
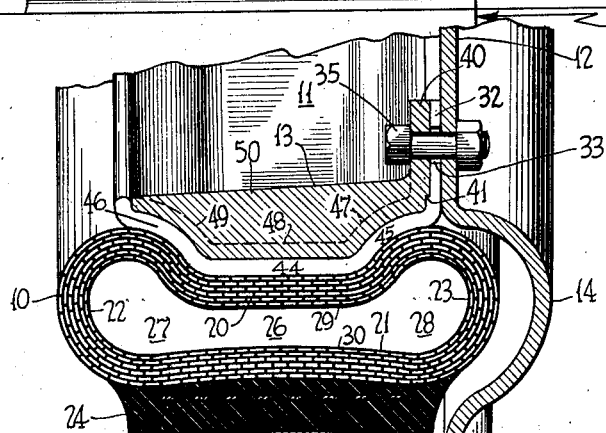
FIG.2
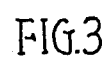
FIG.3
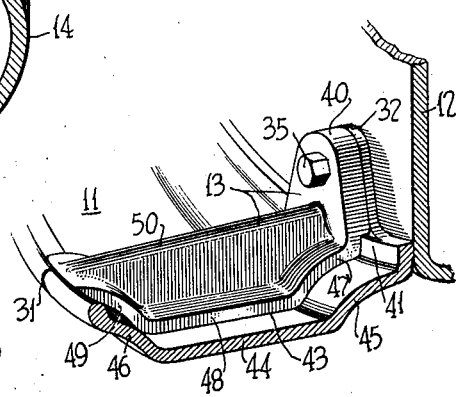
INVENTOR.

Patented May 5, 1936

2,039,498

UNITED STATES PATENT OFFICE 2,039,498

RAILWAY VEHICLE TIRE

John P. Tarbox, Philadelphia, Pa., assignor to Edward G. Budd Manufacturing Company, Philadelphia, Pa., a corporation of Pennsylvania Application June 25, 1932, Serial No. 619,233

6 Claims. (Cl. 295—31)

My invention relates to vehicle wheels and more particularly to that type of wheel particularly adapted for use upon rail vehicles.

In the rail vehicle art it is vitally important that trains be operated upon predetermined schedules and that these schedules be maintained without fail. Consequently, such rail vehicles having pneumatic tires must be so constructed as to be able to operate upon a deflated tire for variable periods of time without seriously affecting the life and wearing qualities of the tire. This invention relates to the above described art and has for its particular object the overcoming of the previously enumerated possible disadvantages and incorporates other desirable features incidental to those enumerated.

I attain the above objects by constructing a tire having the radial inner wall re-entrant outwardly as to the tire, forming a transverse cross section having bulbous edges, in cooperation with a rim member arranged as a tire seat, within the re-entrant portion, and cooperating with the rail engaging flange as a part of the wheel body.

Fig. 1 is a partial side elevation of a wheel assembly.

Fig. 2 is a cross section on the line 2—2 of Fig. 1.

Fig. 3 is a perspective of the lug, especially constructed to span the rim ends.

The fundamental parts of my wheel comprise a tire, a transversely split rim and a lug of suitable complementary rim-engaging section adapted to span or straddle the transverse split of the rim while at the same time serving as a means of securement to the wheel body. The cross section radial dimension of the air space, interiorly of the tire, is such that under conditions of deflation the lowermost point of the rail engaging flange will clear, under all conditions, parts of the track structure such as fish plates and bolts.

Considering the invention in more detail, I have the tire 10 mounted upon the rim 11 which in turn is secured to wheel body 12 by means of lugs, some of which are integral with the rim member and one of which 13 is removable. The wheel body 12 has an axially offset annular rib 14 adapted to be substantially coextensive with the main tire body and a rail engaging flange 15. The track structure is that commonly found in railways comprising a rail 16 of normal cross section showing fish plates 17, with a normal bolt and nut 18 and 19.

The tire is constructed so that radially inner and outer walls 20 and 21 as well as the end walls 22 and 23 are substantially of uniform thickness throughout. The outer wall 21 has at the outer side thereof, a body of rubber 24 comprising the tread portion of less width than the gross tire width as well as of greater width than the surface of the rail head. Interiorly of this body of tread rubber are annularly wound suitable reinforcing members 25 which, under all conditions of retained pressure, maintain the tire with a predetermined effective diameter. These reinforcements also maintain the tire cross section and shape substantially as shown under operating conditions. The air space 26 defined within the tire under normal operating conditions has bulbous edges 27 and 28 due to the re-entrant condition of the radially inner wall 20. This condition allows a greater tire depth at the edges, giving an end wall of larger radius and consequently allowing more free flexing of the tire body without a localization of fatigue stresses which would heat up the tire body unevenly and cause a disintegration of the parts.

The re-entrant tire construction likewise is a desirable feature, inasmuch as the interior complementary surfaces 29 and 30, although having no interior obstructions, serve as a limit stop under conditions of tire deflation. This reduces the expense of constructing the tire, while at the same time it leaves inherently within the structure features vital to the rail wheel art. The rim also acts as a limit stop element. The tire is molded in this form during manufacture so as to have this formation at all times. The rim member 11 is trans-split as seen at 31 as well as the lug 32 which is integral with the rim member at the trans-split section, having a slot 33 in each piece suitable for the passage of the securing bolts 35. The lugs 36 are integral with the rim and are not split, the purpose of splitting the lug 32 being to allow the rim to be broken more readily when it is necessary to demount a tire for replacement.

The lug 13 which is constructed to span the split in the rim member, maintaining it in normal operating condition, is also adapted to fasten the rim to the wheel body. This lug member has a portion 40 which co-acts with the radially extending flange or split lug 32 of the rim and the two members have a complementary shoulder 41 adapted to arrange for a more firm gripping of the parts. The portion 40 also has an opening for the reception of the securing bolts. The axially extending portion 43 of this lug is transversely of complementary contour with the radially outward portion 44 of the rim, and the arcuate radially inwardly extending portions 45 and 46, thus giving the shape as seen with an arcuate portion 47, an axially substantially flat portion 48 and another arcuate portion 49. Centrally extending in reinforcing relation to all the parts of this lug is a transverse rib 50.

Although the description has been rather detailed for the purpose of clearly setting forth the principles of my invention, it is obvious that modifications within the true spirit and scope of the same are to be covered in the hereto appended claims.

What I claim is:

1. In a wheel the combination of a transversely split rim having an outwardly bulged central portion, a tire seated upon said rim and having a reentrant inner wall of uniform thickness fitting over the outwardly bulged central portion of the rim and a transversely ribbed lug having complementary rim engaging surfaces overlapping the joint seam of the rim on its radially inner side through substantially its entire width and arranged for securement to the wheel body.

2. A wheel for rail vehicles comprising a rim base and a retaining flange adapted to engage the side of a rail, said rim base having a central radially outwardly offset portion of a width substantially the width of a rail head upon which the wheel is adapted to operate, and a pneumatic tire seated on said rim base and having a continuous circumferential wall, the outer tread wall being substantially transversely flat, the side walls curved outwardly, and the inner wall in its central portion offset radially toward the outer wall in conformance with the offset in said rim base, whereby the air space within the tire has the form of two deep lateral lobes interconnected by a radially shallow central portion, the depth of this central portion being such as to confine the drop of the wheel upon deflation to a distance less than the normal distance between the retaining flange and parts of the track located laterally of the rail head and extending into the vertical plane of the flange.

3. A wheel for rail vehicles comprising a rim base and a retaining flange adapted to engage the side of a rail, the rim base having its central portion radially outwardly offset, and a pneumatic tire seated on said rim base and having a continuous circumferential wall, the inner wall conforming to the central offset portion of said rim base and to portions laterally thereof and being of substantially uniform thickness with the side walls, the outer tread wall having flexible means associated therewith for preventing its expansion radially beyond the flange, whereby the radial depth of the air space between said outer wall and the offset of said inner wall and rim base is materially less than the depth of said air space laterally of said offset and whereby, in the event of deflation, the drop of the wheel is held within a distance less than the normal distance between the retaining flange and parts of the track located laterally of the rail head and extending into the vertical plane of the flange.

4. A wheel for rail vehicles comprising a rim base and a retaining flange adapted to engage the side of a rail, the rim base having its central portion radially outwardly offset to a substantial extent, and a pneumatic tire seated on said rim base, the inner and side walls of said tire being of substantially uniform extent throughout and the inner wall conforming to the contour of said offset rim base, said offset in the rim confining the air space to less radial depth than the safe distance through which the wheel may be permitted to drop upon deflation without the flange striking parts of the track located laterally of the rail head and extending into the vertical plane of the flange.

5. In combination, a heavy-duty rail-car wheel body having a flange and an annular front opening axial channel section portion adjacent thereto, an axially split rim of radially-inwardly opening axial hollow section having an axially flat central bottom section between arcuate bottom wall sections drawn about points radially outwardly of the rim, means demountably attaching the rim to the body, and a pneumatic tire including an axially flat tread wider than a rail, and a body of endless loop axial section axially wider than the tread and conforming to the radially-outer axial surface of the rim whereby it has radially inner and outer central axial sections spaced a distance limiting the flange drop clear of rail-side parts and axial side lobes projecting radially inwardly, the tire being self-sustaining in the defined shape and having its rear axial side lobe in the annular channel section portion of the wheel body.

6. The combination with a continuous wall pneumatic tire, the outer tread wall of which is substantially transversely flat and the inner wall of which is formed with lateral radially inwardly extending lobes connected by a radially outwardly offset portion, said lobes and offset portion forming a reentrant annular recess, of a trans-split tire-seating rim having tire-seating edge portions extending over a substantial portion of said lobes in tire-seating engagement therewith and a bulging central portion entering said recess to lock the tire transversely onto the rim, the tire being demountable by collapsing the rim inwardly.

JOHN P. TARBOX.